(12) United States Patent
Roth et al.

(10) Patent No.: US 10,300,858 B2
(45) Date of Patent: May 28, 2019

(54) DISPLAY MIRROR TOGGLE PADDLE

(71) Applicant: Gentex Corporation, Zeeland, MI (US)

(72) Inventors: Mark R. Roth, Grand Rapids, MI (US); Nigel T. Lock, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/915,694

(22) Filed: Mar. 8, 2018

(65) Prior Publication Data
US 2018/0257568 A1   Sep. 13, 2018

Related U.S. Application Data (60) Provisional application No. 62/469,017, filed on Mar. 9, 2017.

(51) Int. Cl.
| | |
|---|---|
| *B60R 1/04* | (2006.01) |
| *B60R 1/08* | (2006.01) |
| *G02B 7/182* | (2006.01) |
| *B60R 1/12* | (2006.01) |

(52) U.S. Cl.
CPC ............ *B60R 1/086* (2013.01); *B60R 1/04* (2013.01); *B60R 1/12* (2013.01); *G02B 7/182* (2013.01); *B60R 2001/1253* (2013.01); *B60R 2300/8046* (2013.01)

(58) Field of Classification Search
CPC .. B60R 1/04; B60R 1/086; B60R 1/12; B60R 2001/1253; B60R 2300/8046
See application file for complete search history.

(56) References Cited

U.S. PATENT DOCUMENTS

| | | | | |
|---|---|---|---|---|
| 3,870,404 A | * | 3/1975 | Wilson | B60R 1/086 359/606 |
| 4,319,806 A | * | 3/1982 | Brandenburg | B60R 1/086 359/606 |
| 4,435,042 A | * | 3/1984 | Wood | B60R 1/086 359/603 |
| 4,436,371 A | * | 3/1984 | Wood | B60R 1/086 359/603 |
| 4,733,336 A | * | 3/1988 | Skogler | B60R 1/086 362/142 |
| 4,807,096 A | * | 2/1989 | Skogler | B60R 1/086 362/142 |

(Continued)

*Primary Examiner* — Bao-Luan Q Le
(74) *Attorney, Agent, or Firm* — Price Heneveld LLP; Bradley D. Johnson (57) ABSTRACT

A vehicle rearview mirror includes a substrate having a reflective surface and an actuation mechanism having a support unit coupled with the substrate. The actuation mechanism also has a mounting plate with a first end thereof rotatably coupled with the support unit. A toggle latch is rotatably coupled with mounting plate and alternately engages with the support unit in respective first and second positions. The second position corresponds with rotation of the support unit toward a second end of the mounting plate from the first position. The toggle latch is rotatable out of the first and second positions into a release position wherein the toggle latch is disengaged with the support unit. A toggle paddle is rotatably coupled with the mounting plate and is positioned adjacent the toggle latch to move the toggle latch into the release position by rotation of the of the toggle paddle.

20 Claims, 12 Drawing Sheets

(56) References Cited

U.S. PATENT DOCUMENTS

| | | | |
|---|---|---|---|
| 4,822,140 A * | 4/1989 | Mittelhauser | B60R 1/086 359/604 |
| 4,826,289 A * | 5/1989 | Vandenbrink | B60R 1/086 359/605 |
| 4,836,648 A * | 6/1989 | Niwayama | B60R 1/086 359/606 |
| 4,995,581 A * | 2/1991 | Koiwai | B60R 1/04 248/480 |
| 5,178,448 A * | 1/1993 | Adams | B60R 1/086 362/494 |
| 5,327,288 A * | 7/1994 | Wellington | B60R 1/086 248/479 |
| 5,377,949 A * | 1/1995 | Haan | B60R 1/04 248/483 |
| 5,521,760 A * | 5/1996 | De Young | B60R 1/086 248/467 |
| 5,973,805 A * | 10/1999 | Yamana | B60R 1/086 359/1 |
| 6,168,277 B1 * | 1/2001 | Kanazawa | B60R 1/086 359/603 |
| 6,598,980 B2 * | 7/2003 | Marusawa | B60R 1/086 359/603 |
| 8,743,203 B2 * | 6/2014 | Karner | B29C 45/0017 348/148 |
| 9,694,752 B2 * | 7/2017 | Kuester | B60R 1/12 |
| 9,963,075 B2 * | 5/2018 | Hallack | B60R 1/04 |
| 10,029,615 B2 * | 7/2018 | Hallack | B60R 1/04 |
| 10,112,540 B2 * | 10/2018 | Minikey, Jr. | B60R 1/04 |
| 2003/0011906 A1 * | 1/2003 | Marusawa | B60R 1/086 359/872 |
| 2003/0011908 A1 * | 1/2003 | Marusawa | B29C 45/006 359/872 |
| 2003/0137757 A1 * | 7/2003 | Wachi | B60R 1/086 359/880 |
| 2010/0085653 A1 * | 4/2010 | Uken | B60R 1/04 359/872 |
| 2015/0175074 A1 | 6/2015 | De Wind et al. | |
| 2016/0114730 A1 * | 4/2016 | Lee | B60R 1/086 359/865 |
| 2016/0129842 A1 * | 5/2016 | Kuester | B60R 1/12 348/148 |
| 2016/0341963 A1 * | 11/2016 | Minikey, Jr. | B60R 1/04 |
| 2017/0008457 A1 * | 1/2017 | De Wind | B60R 1/086 |
| 2017/0080867 A1 * | 3/2017 | Hallack | B60R 1/04 |
| 2017/0120824 A1 * | 5/2017 | Hallack | B60R 1/04 |
| 2017/0166133 A1 * | 6/2017 | Hallack | B60R 1/04 |
| 2017/0203694 A1 * | 7/2017 | Lundy | B60R 1/025 |

* cited by examiner

DISPLAY MIRROR TOGGLE PADDLE

CROSS-REFERENCE TO RELATED APPLICATION

This application claims priority to and the benefit under 35 U.S.C. § 119(e) of U.S. Provisional Patent Application No. 62/469,017, filed on Mar. 9, 2017, entitled DISPLAY MIRROR TOGGLE PADDLE, the entire disclosure of which is hereby incorporated herein by reference.

TECHNOLOGICAL FIELD

The present disclosure relates generally to a full display mirror actuation mechanism and more particularly, relates to an actuation mechanism with a spring-biased toggle paddle.

BACKGROUND

Various types of rearview mirrors can be used in connection with vehicle interiors. In general, rearview mirrors are mounted adjacent the windshield either by attachment with the windshield or to an internal component adjacent the headliner. Such attachment is, for example, achieved by a mounting that couples with an actuation mechanism internal to the mirror housing. A substrate is affixed with the mirror housing and is generally configured to present an image of the view to the rear of the vehicle and, accordingly, may be adjustable by movement of the housing about the mounting structure.

In the case of a standard rearview mirror, the substrate is often a prism-type mirror that provides for a viewing angle at which the substrate reflects the rearward view of the mirror with a reduced luminosity to provide a dimming effect useful when driving at night, for example. In such an embodiment, the dimmed viewing angle for the substrate may be at a predetermined angle upward (i.e. toward the headliner) relative to the "normal" viewing angle. To achieve such positioning, rearview mirrors include various types of actuation mechanisms to provide for user control in repositioning of the substrate. Such movement can be achieved by manipulation of a lever, which can cause the actuation mechanism to move between stable positions, thereby causing movement of the substrate through a predetermined angle relative to the mounting structure that appropriately positions the substrate in a corresponding viewing position. Further, the actuation mechanism can couple with the mounting to allow general adjustment of the housing and substrate with respect to the driver for viewing of the image viewable on the substrate. In this manner, the actuation mechanism can allow the substrate to toggle between the stable viewing positions without changing the positions themselves such that the substrate provides generally the same view in the night mode as has been selected for the standard mode.

Some existing actuation mechanisms achieve movement between the above-referenced stable positions by way of a resiliently deformable spring plate. In general, such spring plates include a bent section to provide an area of flexation that accommodates movement of components within the actuation mechanism. The spring force achieved by such flexation can urge the actuation mechanism to one of the stable positions. These types of structures, while providing biasing forces toward both stable positions, may provide force in the directions toward and away from the stable positions in varying amounts. In particular, the shape of the bent portion or portions may serve to secure the mechanism in one of the stable positions, including making it less susceptible to unintended movement out of such position by a force applied on the mirror housing, for example. However, in the opposite position, the mechanism may be susceptible, depending on the particular spring force and other internal forces, to inadvertent movement out of the stable position, which may be caused by a user adjusting the position of the mirror by grasping and moving the housing. In the case of a standard prism mirror, such inadvertent actuation may be inconvenient. Accordingly, further advances may be desired.

SUMMARY

According to an aspect of the present disclosure, a vehicle rearview mirror includes a substrate having a reflective surface thereon. The rearview mirror also includes an actuation mechanism having a support unit coupled with the substrate opposite the reflective surface. The actuation mechanism also has a mounting plate with a first end thereof rotatably coupled with the support unit and a second end spaced from the first end. A toggle latch is rotatably coupled with mounting plate and alternately engages with the support unit in respective first and second positions. The second position corresponds with rotation of the support unit toward the second end of the mounting plate from the first position. The toggle latch is rotatable out of the first and second positions into a release position wherein the toggle latch is disengaged with the support unit. A toggle paddle is rotatably coupled with the mounting plate and is positioned adjacent the toggle latch to move the toggle latch into the release position by rotation of the of the toggle paddle.

According to another aspect of the present disclosure, a vehicle includes a windshield, a headliner adjacent an upper edge of the windshield, and a mirror assembly. The mirror assembly has a substrate with a reflective surface thereon, a support unit coupled with the substrate opposite the reflective surface, a mounting plate having a first end rotatably coupled with the support unit and a second end spaced from the first end, and a mounting structure coupled with the mounting plate and coupling with the vehicle adjacent the upper edge of the windshield. A toggle latch is rotatably coupled with the mounting plate and alternately engages with the support unit in respective first and second positions. The second position corresponds with rotation of the support unit toward the second end of the mounting plate from the first position. The toggle latch is further rotatable out of the first and second positions into a release position wherein the toggle latch is disengaged with the support unit. A toggle paddle is rotatably coupled with the mounting plate and is positioned adjacent the toggle latch to move the toggle latch into the release position by rotation of the toggle paddle.

According to another aspect of the present disclosure, an actuation mechanism for a vehicle mirror includes a support unit and a mounting plate having a first end rotatably coupled with the support unit. A toggle latch is rotatably coupled with the mounting plate, alternately engages with the support unit in respective first and second positions, and is rotatable out of the first and second positions into a release position wherein the toggle latch is disengaged with the support unit. A toggle paddle is rotatably coupled with the mounting plate and positioned adjacent the toggle latch to move the toggle latch into the release position by rotation of the toggle paddle.

These and other features, advantages, and objects of the present device will be further understood and appreciated by those skilled in the art upon studying the following specification, claims, and appended drawings.

DETAILED DESCRIPTION OF EMBODIMENTS

Figure 1:
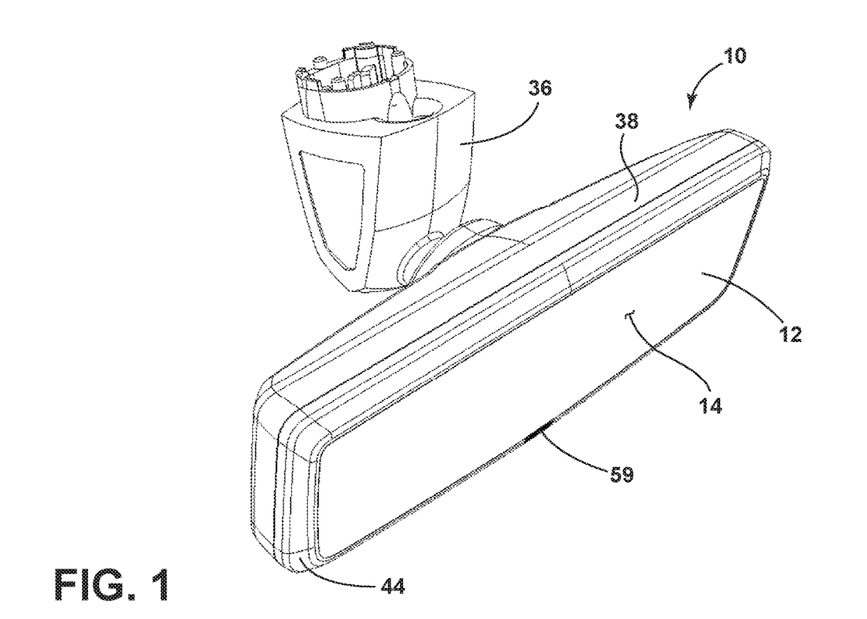
FIG. 1 is a front perspective view of a rearview mirror.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
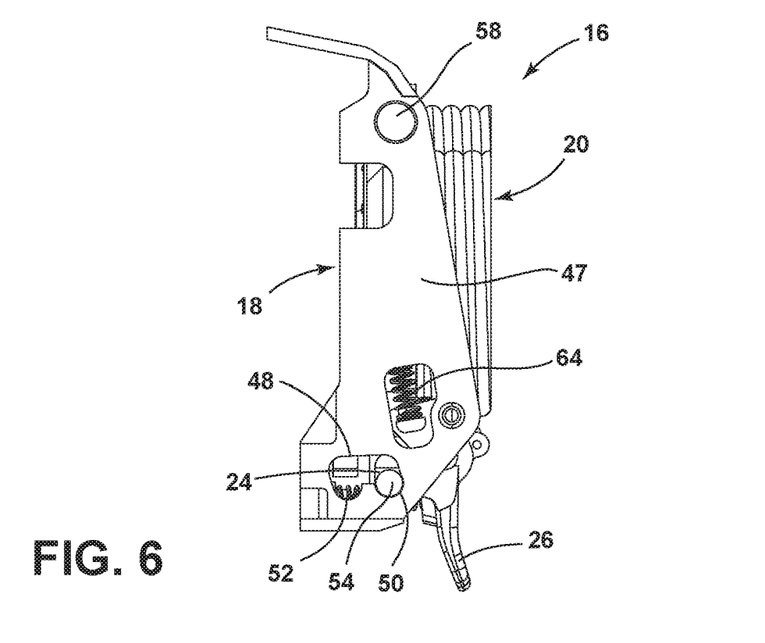
FIG. 6 is a right side view of the actuation mechanism in the upwardly-angled condition.
Figure 7:
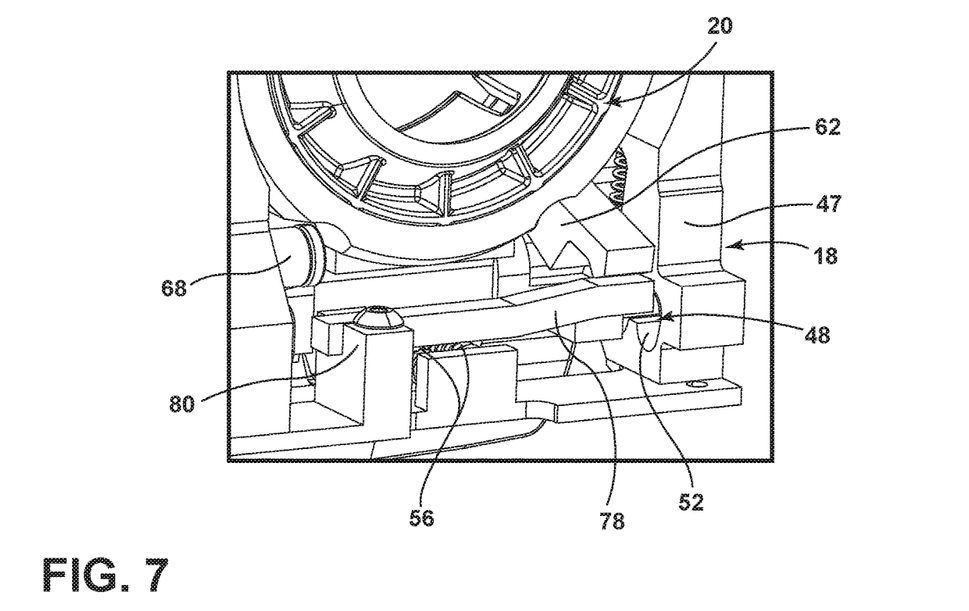
FIG. 7 is a perspective detail view of the actuation mechanism in the upwardly-angled latched condition.
Figure 8:
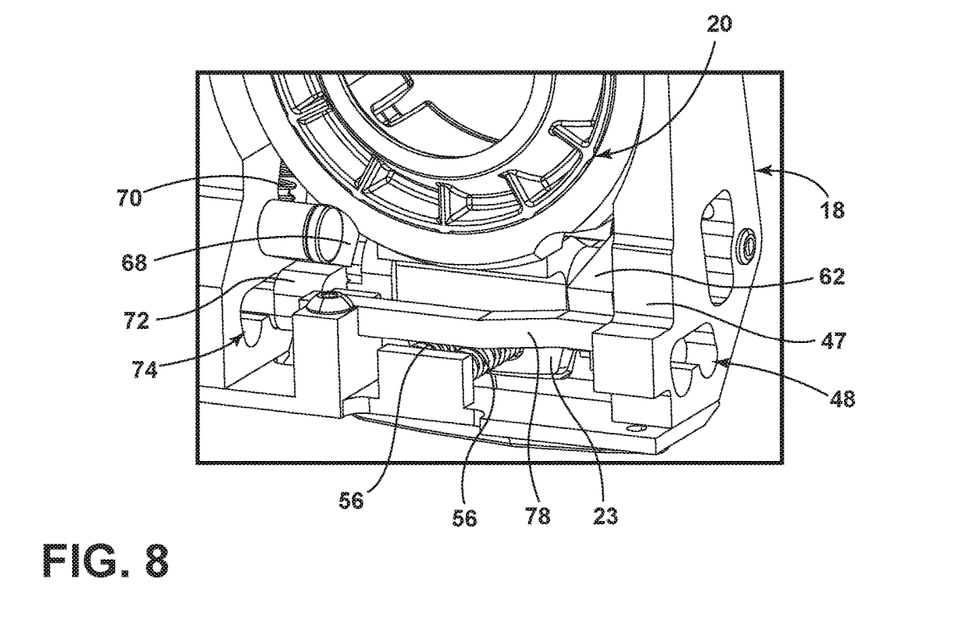
FIG. 8 is a further perspective detail view of the actuation mechanism in the upwardly-angled condition.
Figure 16:
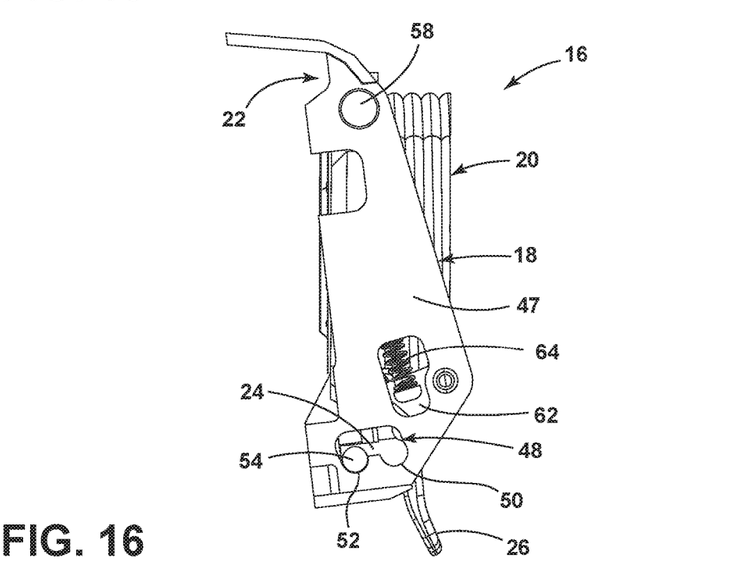
FIG. 16 is a right side view of the actuation mechanism in a downwardly-angled latched condition.

Referring now to FIGS. 1-4, reference numeral 10 indicates a rearview mirror. Rearview mirror 10 includes a substrate 12 having a reflective surface 14 thereon. Rearview mirror 10 also includes an actuation mechanism 16 having a support unit 18 coupled with the substrate 12 opposite the reflective surface 14. The actuation mechanism 16 also has a mounting plate 20 with a first end 22 thereof rotatably coupled with the support unit 18. A toggle latch 24 is rotatably coupled with mounting plate 20 and alternately engages with the support unit 18 in respective first and second positions (FIGS. 6 and 16, respectively). The second position corresponds with rotation of the support unit 18 toward the second end 23 of the mounting plate 20 from the first position. The toggle latch 24 is rotatable out of the first and second positions into a release position wherein the toggle latch 24 is disengaged with the support unit 18. A toggle paddle 26 is rotatably coupled with the mounting plate 20 and is positioned adjacent the toggle latch 24 to move the toggle latch 24 into the release position by rotation of the of the toggle paddle 26. In particular, toggle paddle 26 may be integral with toggle latch 24 in a single unit. In another aspect, toggle latch 24 and toggle paddle 26 can be separate elements rigidly coupled together so movement of toggle paddle 26 cause movement of toggle latch in unison.

Figure 3:
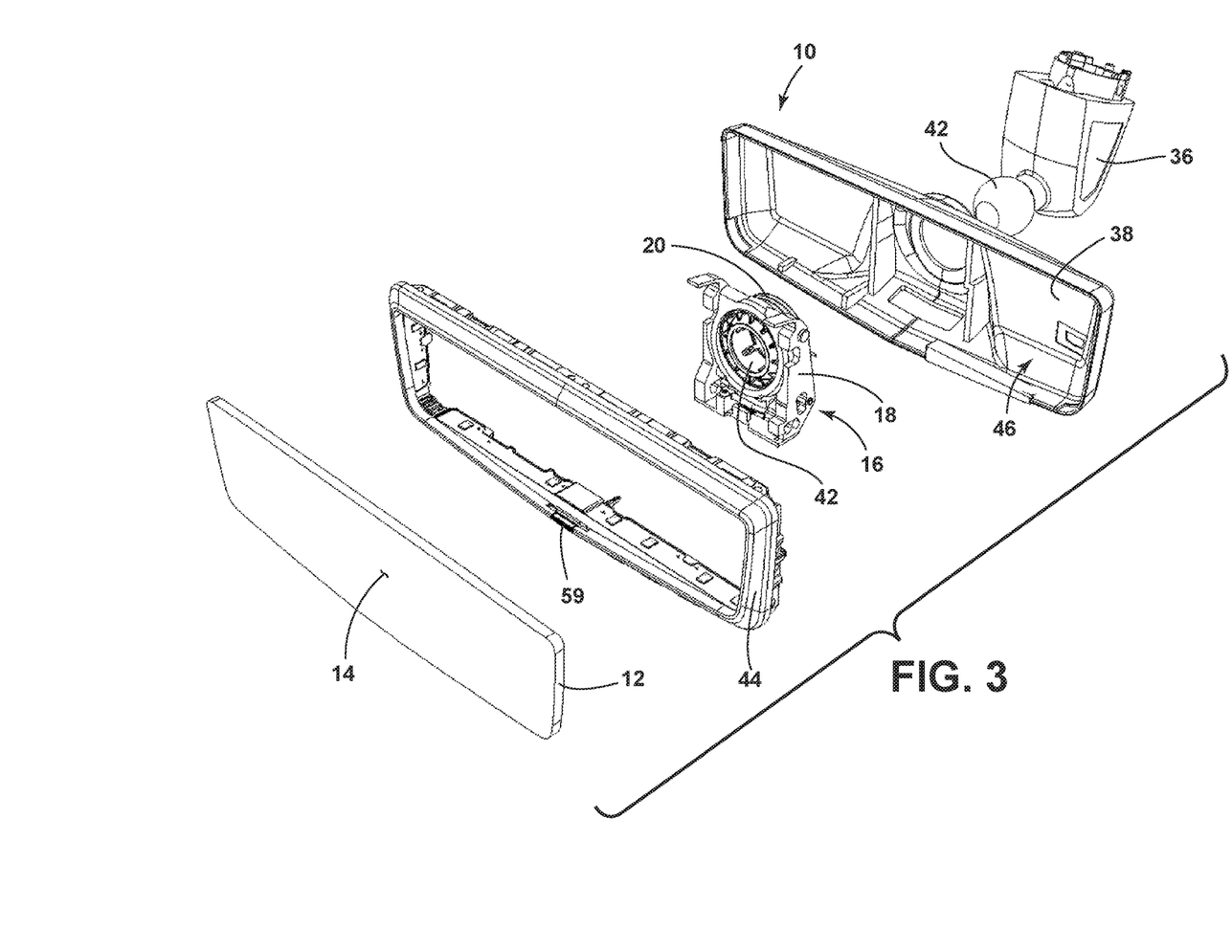
FIG. 3 is an exploded view of the rearview mirror including an internal actuation mechanism thereof.
Figure 4:
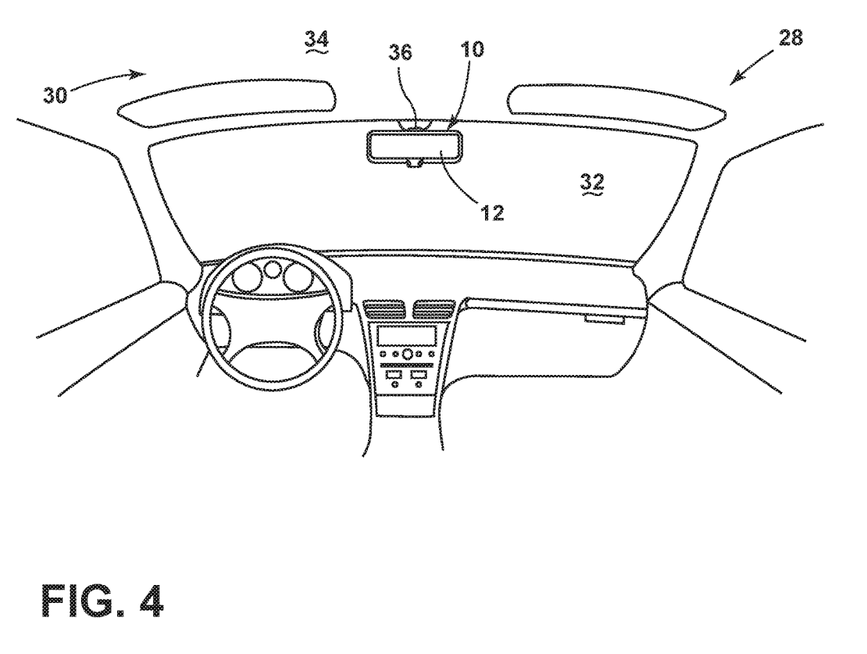
FIG. 4 is a perspective view of a portion of a vehicle interior including the rearview mirror.

As shown in FIG. 4, rearview mirror 10 can be used in connection with a vehicle 28, particularly within interior 30 thereof. In particular, rearview mirror 10 can be mounted adjacent a windshield 32 of vehicle 28 either by attachment with the windshield 32 itself or to an internal component adjacent headliner 34 (which may include a portion of the vehicle frame, a vehicle panel, or other support structure, for example). Such attachment is achieved by a mounting arm 36 that is coupled with vehicle 28, as described, and couples with actuation mechanism 16 (FIG. 3), as explained further below, by extending through an opening 39 (FIG. 2) in a rear housing 38 (FIG. 2) of rearview mirror 10 that encloses the various internal structures thereof opposite and surrounding substrate 12. The support of mounting plate 20 (FIG. 3) by mounting arm 36 and the above-described coupling of support unit with mounting plate 20 and with substrate 12 serves to position substrate 12 in a desired position within interior 30. In particular, substrate 12 is generally configured to present an image (reflected or video, as described below) to a driver of vehicle 28 of the view to the rear of vehicle 28 and, accordingly, may be adjustable by movement of substrate 12 with respect to mounting arm 36. In one embodiment, substrate 12 can be in the form of a prism mirror substrate of a generally transparent material having a tapered shape and an internal reflective surface. In this manner, the above-described alternate engagement of toggle latch 24 in the first (FIG. 6) and second (FIG. 16) positions can, as described further below, cause rotation of substrate 12 between an upwardly-angled position, in which the highly-reflective surface reflects an image of the headliner 34 (the outer, polished surface reflecting an image toward the rear of the vehicle 28) and a downwardly-directed position, in which the image reflected off of the highly-reflective surface is oriented toward the rear of the vehicle 28 so as to be visible by the driver. In general, this arrangement allows for separate day and night modes in which the upwardly-directed position presents a dimmer image to the driver, by way of the polished surface instead of the mirror surface.

In another embodiment, substrate 12 may include a video display panel along a portion or an entirety thereof such that rearview mirror 10 is what may be referred to as a full-display mirror. Substrate 12, when including such a display, may be referred to herein as "display substrate 12" and may be capable of displaying a simulated mirror-image of the view to the rear of vehicle 28 (that may be captured by an appropriately-positioned video camera or the like) when the display is in an active state. Such an image may generally replicate that which would be available from a typical reflective mirror and can be supplemented with other information presented on display substrate 12. In combination with such display substrate 12, reflective surface 14 (FIG. 1) may overlie the display as a coating or separate element having properties to both provide a reflected image as well as to permit a video image of display substrate 12 to be visible therethrough.

The presence of reflective surface 14 permits substrate 12 to be used as a standard rearview mirror (i.e. without the need to view the displayed image) when the display is in an inactive state, which may occur when the related vehicle 28 is not running or when power to the display substrate 12 is interrupted, for example. When in the active state, however, the presence of the reflective surface 14 over display substrate 12 can cause the image reflected by reflective surface 14 to compete with an image presented on display substrate 12. To alleviate such image competition, substrate 12 can be positioned such that reflective surface 14 reflects an image of the headliner 34 toward the driver. Because vehicle headliners are of generally consistent, non-reflective material, such an image may compete less with the video image of display substrate 12.

Rearview mirror 10, by way of the actuation mechanism 16 (FIG. 3), can allow for a user to control repositioning of substrate 12 between the above-described upwardly- and downwardly-directed positions for the desired use of mirror 10, depending on the type of substrate 12. Such movement can be achieved by manipulation of toggle paddle 26 to move toggle latch 24 into the release position (FIGS. 10 and 19), thereby allowing movement of toggle latch between the first position, shown in FIG. 6, for example, to the second position, shown in FIG. 16, which corresponds with movement of support unit 18 about first end 22 of mounting plate 20. Because substrate 12 is fixed with respect to support unit 18, such movement results in movement of substrate 12 through a predetermined angle relative to mounting arm 36. In an example, such movement can be through a downward (i.e. away from headliner 34) angle 40 (FIG. 16) of between about 5° and 10°, and in one embodiment about 7°.

Figure 2:
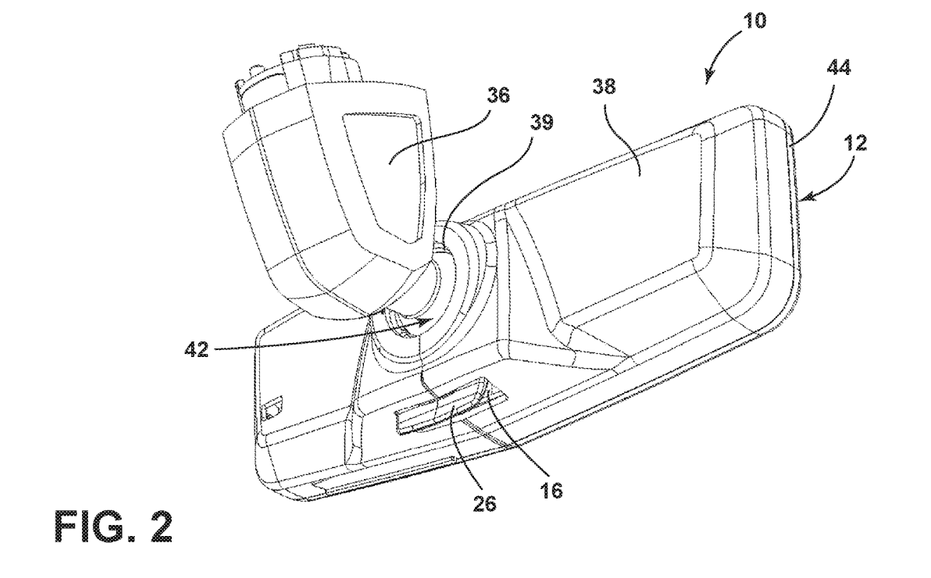
FIG. 2 is a rear perspective view of the rearview mirror.

As can be seen in FIGS. 2 and 3, mounting arm 36 can couple with actuation mechanism 16 by attachment with mounting plate 20 by a ball and socket coupling 42. This arrangement can allow for the above-mentioned general adjustment of substrate 12 so as to position substrate 12 at a desired position with respect to the driver for viewing of the image viewable on substrate 12 in, for example a "day" mode. As described further below with respect to FIG. 10, movement of toggle latch 24 from the first position to the second position, for example, can cause movement of both housing 38 and substrate 12 relative to mounting plate 20, while mounting plate 20 remains generally static. Such a configuration can allow substrate 12 to toggle between the positions for substrate 12 provided by the first and second latched positions of actuation mechanism 16 without changing the positions themselves.

Referring to FIGS. 1-3, housing 38 is shown in the form of a single-piece unit, and can be made from a single piece of injection molded plastic or the like, although other materials are possible. In the depicted embodiment, support unit 18 can be coupled with housing 38 on an interior thereof. In turn, substrate 12 can be coupled to housing 38 by way of a bezel 44 or other secondary housing piece to fix substrate 12 over an open side 46 of housing 38. In another example, support unit 18 may be affixed with substrate 12 and housing 38 (including by bezel 44 or the like). In either example, housing 38 is structured so that an interior is defined therein and is of a sufficient depth to retain internal structures of mirror 10, including actuation mechanism 16, and other related structures, such as those related to a display substrate 12.

As shown in FIGS. 5-9, support unit 18 includes two laterally-spaced ribs 47 that are positioned on opposite sides of mounting plate 20. Each of the ribs 47 defines a cutout 48 that defines first 50 and second 52 detents that correspond with the above-mentioned first and second positions of toggle latch 24, respectively. In particular, toggle latch 24 is shown having a post 54 on an end thereof, the post 54 being shown received within first detent 50 in FIGS. 6-9 and toggle latch 24, accordingly, engaging with support unit 18 in a position corresponding with the depicted first position of toggle latch 24 and the upwardly-angled position of support unit 18 (and accordingly substrate 12) with respect to mounting arm 36. Post 54 may be integrally formed on the end of toggle latch 24 or may be a separate element rigidly coupled with toggle latch 24. In this manner, movement of toggle paddle 26, which as discussed above causes movement of toggle latch 24, causes similar movement of post 54 in unison therewith.

Figure 5:
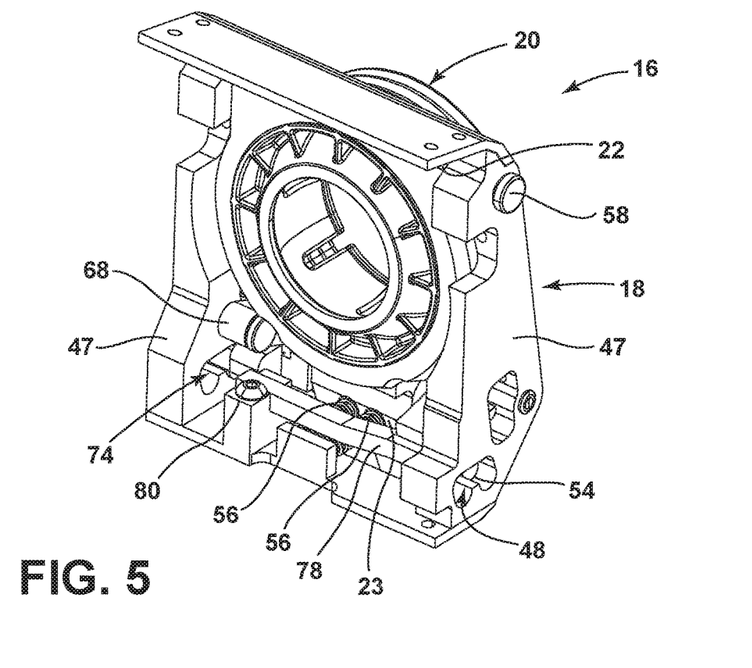
FIG. 5 is a front perspective view of the actuation mechanism in an upwardly-angled condition.

As shown in FIG. 5, one or more primary springs 56 are positioned between and operably engaged with each of mounting plate 20 and support unit 18. The primary springs 56 in the illustrated example are coils springs under compression in their position between mounting plate 20 and support unit 18 such that in the upwardly-angled first position illustrated in FIGS. 5-9, primary springs 56 urge support unit 18 away from second end 23 of mounting plate 20, which is constrained as rotational movement about hinge 58 which secures first end 22 of mounting plate with support unit 18. In other embodiments, a single primary spring 56 in the form of a leaf spring or the like may be substituted for the illustrated coil springs or one or more torsion springs may be positioned adjacent hinge 58. These types of configurations for primary spring 56 may provide space to further include a damper between support unit 18 and mounting plate 20, which may help to provide desirable movement characteristics of support unit 18 rotating away from mounting plate 20, such as during movement from the second position to the first position, as described further below. The force provided by primary springs 56 helps to maintain post 54 of toggle latch 24 within the first detent 50 of cutout 48 corresponding with the depicted first position.

Figure 9:
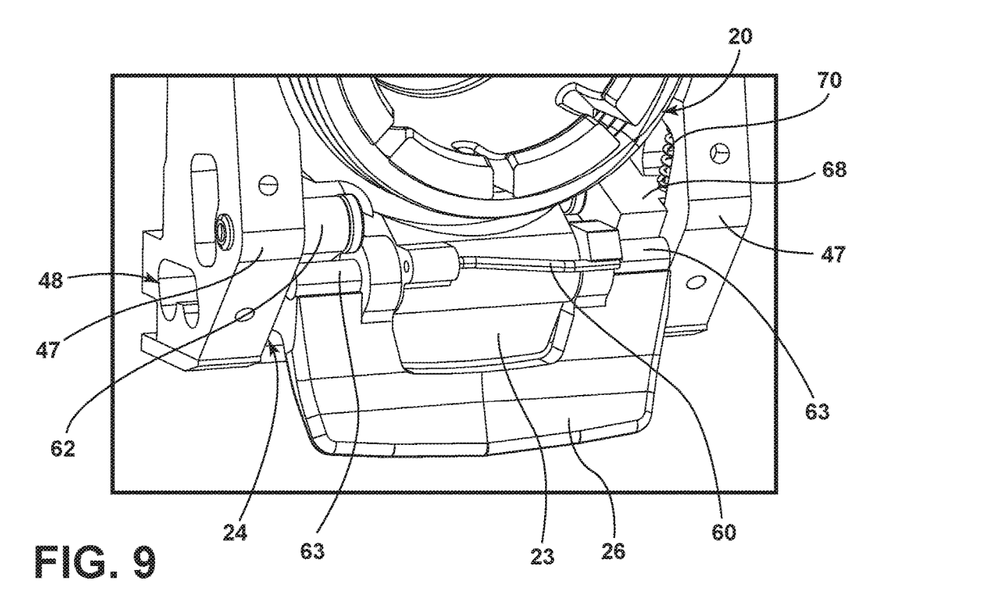
FIG. 9 is a still further perspective detail view of the actuation mechanism in the upwardly-angled condition.

As discussed further below, movement of support unit 18 into the downwardly angled position corresponding to the second position of toggle latch 24 requires a force to be applied to an area of rearview mirror 10 adjacent second end 23 of mounting plate, such as within area 59 of bezel 44 depicted in FIG. 1. To allow for such movement without changing the positioning of mounting plate 20 about mounting arm 36, the force required for such compression of primary springs 56 must be less than the internal friction within ball and socket coupling 42, as overcoming such friction will cause repositioning of coupling 42. Even further, it may be desirable to configure actuation mechanism 16 in such a manner that a force on housing 38, including in area 59 can be sufficiently low to provide easy movement of support unit 18 (and, accordingly, substrate 12) into the downwardly angled position shown in FIG. 16. Accordingly, the force provided by primary springs 56 may be well under the internal friction of coupling 42. As shown in FIG. 9, a lever spring 60 is positioned between mounting plate 20 and toggle paddle 26 to maintain toggle paddle 26 in the depicted rearward, unactuated position. Further, in the present embodiment, toggle paddle 26 and toggle latch 24 are integrally formed in a single unit, which results in the force of lever spring 60 also applying a force on toggle latch 24 toward the depicted first position. Such a force, however, may be present to provide a desired tactile feel for paddle 26 rather than to meaningfully contribute to retention of toggle latch 24 in the first position (or the second position, as discussed below). Accordingly, it may be desirable to structure actuation mechanism 16 such that additional force is provided to secure toggle latch 24 in the desired position.

As shown in FIGS. 6-9, actuation mechanism 16 can further include a first locking pawl 62 rotatably coupled with one of the ribs 47 included in support unit 18. First locking pawl 62 can be urged into contact with toggle latch 24 by a corresponding support spring 64 positioned between rib 47 and toggle latch 24. In this manner, the spring force of support spring 64 is applied to toggle latch 24 to further urge it into the depicted first detent 50, thereby increasing the force needed on toggle paddle 26 in the forward direction 66 (FIG. 10) to move toggle latch 24 out of the first position. Still further, actuation mechanism 16 can include a second locking pawl 68 rotatably coupled with the rib 47 opposite first locking pawl 62. Second locking pawl 68 can extend in a direction away from substrate 12 (FIG. 3) opposite the direction in which first locking pawl 62 extends. In this manner, second locking pawl 68 can be similarly urged downward into the position shown in FIG. 8 by a second support spring 70 such that second locking pawl 68 engages with a portion of toggle paddle 26 (which is depicted as an upper portion thereof forming part of the rotatable coupling of toggle paddle 26 with mounting plate 20). This positioning operates to directly retain support unit 18 in the upwardly extended position depicted in FIGS. 5-9 and corresponding with the partitioning of toggle latch 24 in the depicted first position. Positioned adjacent second locking pawl 68, actuation mechanism 16 can further include a second toggle latch 72 that can engage with a second cutout 74 in the corresponding rib 47 in a manner similar to that which is described above with respect to toggle latch 24 and cutout 48. In this manner, second locking pawl 68 can also be urged into contact with second toggle latch 72 by second support spring 70 to further contribute to retention of both the first toggle latch 24 and the second toggle latch 72 in the respective first position. As with first toggle latch 24, second toggle latch 72 may be integrally formed in a single unit with toggle paddle 26.

In this manner, rearview mirror may be retained in the position of substrate 12 corresponding with the positioning of toggle latch 24 in the depicted first position against inadvertent movement, such as that caused by intentional repositioning of substrate 12 about mounting arm 36 by intentional force on housing 38, for example, by the combined force of primary springs 56 as well as support springs 70 by way of first and second pawls 62 and 68 and the blocking positioning of second pawl 68 against toggle paddle 26. As shown in FIGS. 10-16, rotation of toggle paddle 26 in direction 66 can move first toggle latch 24, as well as second toggle latch 72 into the respective released positions, allowing a force on area 59 of bezel 44 (FIG. 1) to move support unit 18 and, accordingly, substrate 12 into the downwardly angled position. In this manner, the force required to move toggle paddle 26 in direction 66 against the above-mentioned combined forces should be less than the internal friction of coupling 42 (FIG. 2) to prevent movement of mounting plate 20 about mounting arm 36 (FIG. 1).

Figure 10:
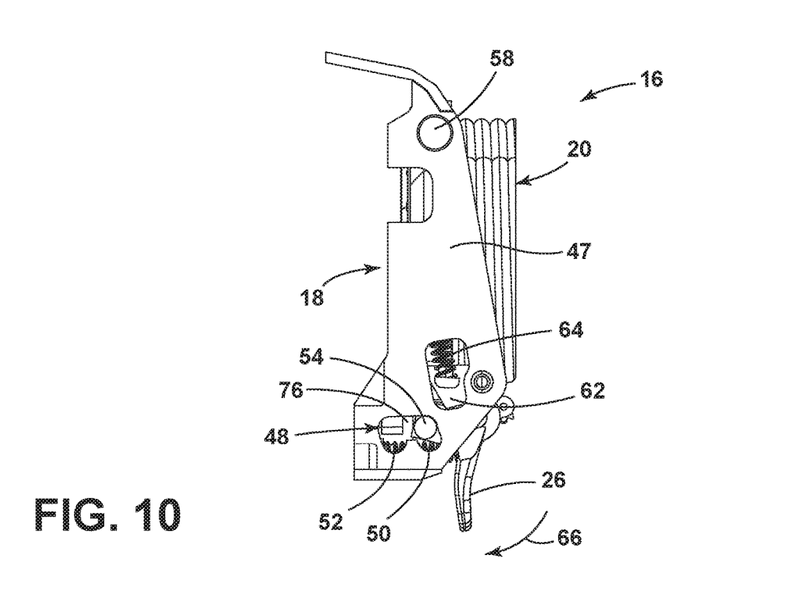
FIG. 10 is a right side view of the actuation mechanism in an initial released condition.
Figure 11:
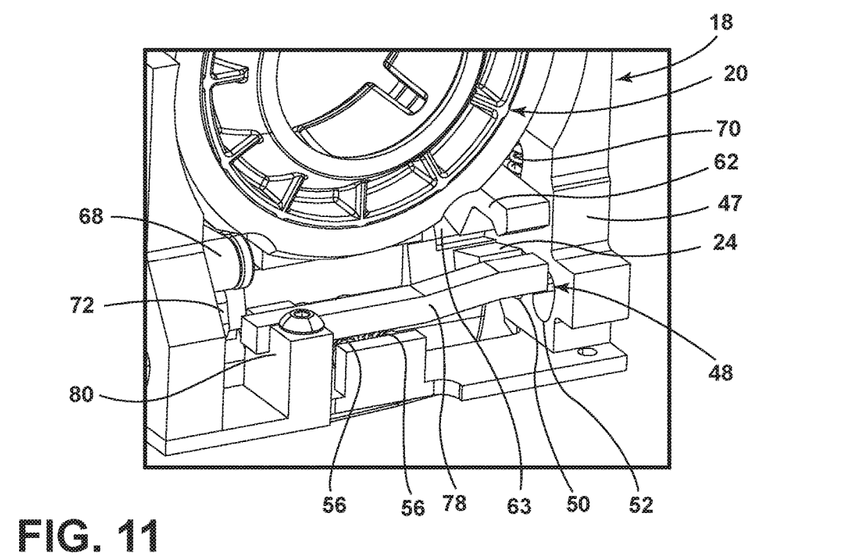
FIG. 11 is a perspective detail view of the actuation mechanism in the initial released condition.
Figure 12:
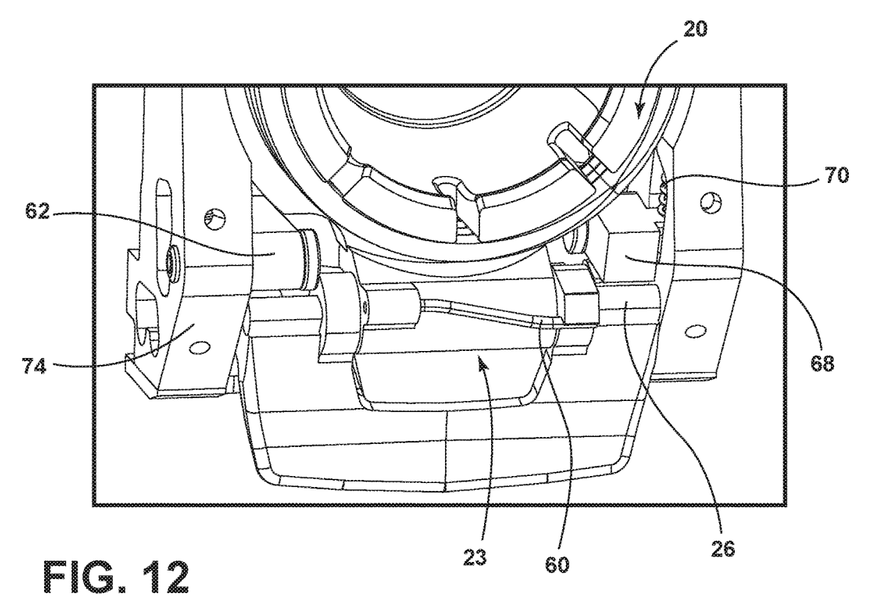
FIG. 12 is a further perspective detail view of the actuation mechanism in the initial released condition.

Turning to FIGS. 10-12, the above-mentioned movement of toggle paddle 26 in direction 66 by a force sufficient to overcome the combined forces of lever spring 60, first support spring 64, and second support spring 70 can move the post 54 of first toggle latch 24 upward out of first detent 50 and into an intermediate portion 76 of cutout 48. Between the first and second detents 50 and 52 (similar positioning of second toggle latch 72 can occur with respect to second cutout 74). In this manner, the toggle latches 24 and 72 are considered disengaged with the respective cutouts 48 and 74, even though portions thereof may remain in contact therewith, as the positioning of post 54, for example, does not affect the ability of support unit 18 to move with respect to mounting plate 20.

As can be seen in FIG. 11, the upward force of toggle latch 24 on first locking pawl 62, from rotational force on toggle paddle 26, forces locking pawl 62 upward to the illustrated position where it is disengaged from the corresponding portion of toggle paddle 26, which may, for example include an upper hinge portion 63 thereof. Similarly, the upward force of second toggle latch 72 on second locking pawl 68 causes similar upward movement thereof, including to a position where second locking pawl 68 is disengaged from toggle paddle 26 (as shown in FIG. 12), thus removing the blocking force provided by second locking pawl 68 between support unit 18 and mounting plate 20. Accordingly, force on area 59 (FIG. 1) exceeding the spring force provided by primary springs 56 will rotate support unit 18 and, accordingly, substrate 12 into the downwardly-angled position shown in FIGS. 13-15.

Figure 13:
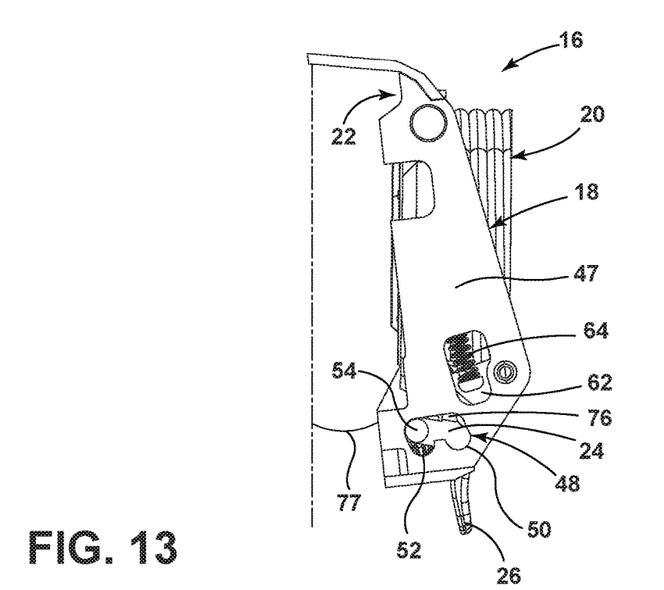
FIG. 13 is a right side view of the actuation mechanism in a downwardly-angled released condition.
Figure 14:
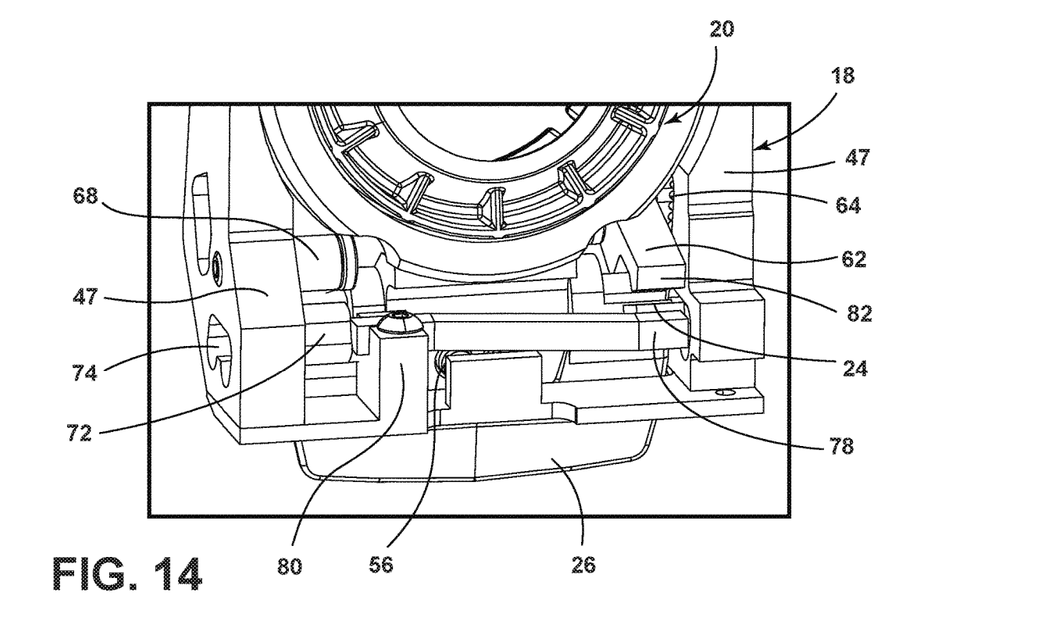
FIG. 14 is a perspective detail view of the actuation mechanism in the downwardly-angled released condition.
Figure 15:
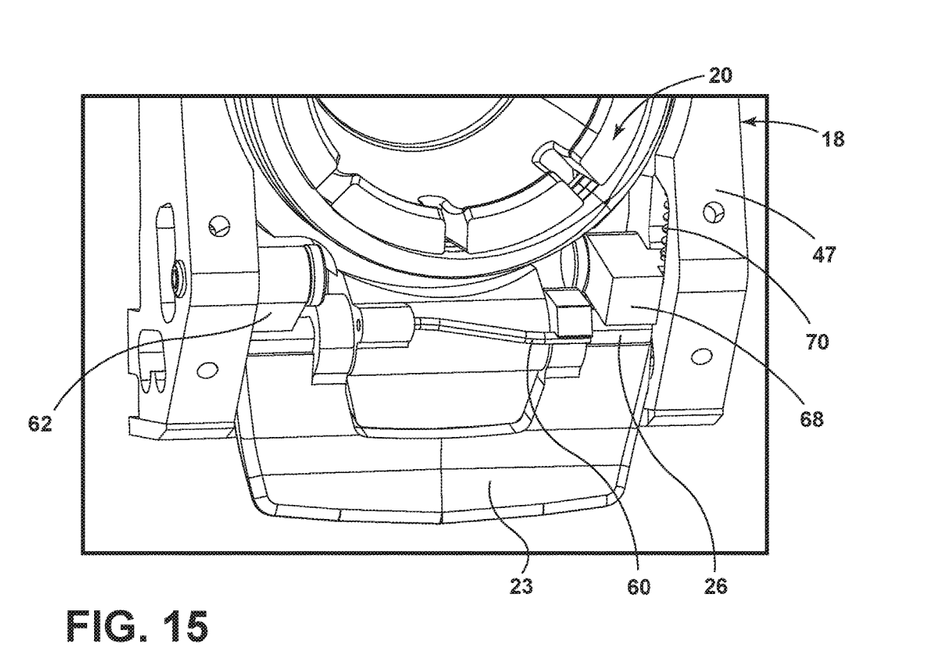
FIG. 15 is a further perspective detail view of the actuation mechanism in the downwardly-angled released condition.

As shown in FIG. 14, when support unit 18 is moved into the illustrated downwardly-angled position, which may be through an angle 77 of between 5° and 10°, including about 7°, as in the depicted embodiment, toggle latch 24 moves into contact with blocking element 78, which may be an elongated flexible (i.e., elastically deformable) bar or other element of a predetermined thickness approximately equal to a vertical displacement of the free end of toggle latch 24 between the first and second positions thereof and the release position. As shown, blocking element 78 is cantilevered from a fixed attachment position 80 with support unit 18 such that it extends laterally toward one of the ribs 47 and can be bent by continued movement of support unit 18 with respect to toggle latch 24. In this manner, blocking element 78 bends to allow support unit 18 to move such that post 54 is positioned within cutout 48 above second detent 52 as shown in FIG. 13. As shown in FIG. 15, movement of support unit 18 into the illustrated downwardly-angled position also causes second locking pawl 68, as well as a portion of first locking pawl 62 inward of tapered free end 82 to move behind toggle paddle 26.

Figure 17:
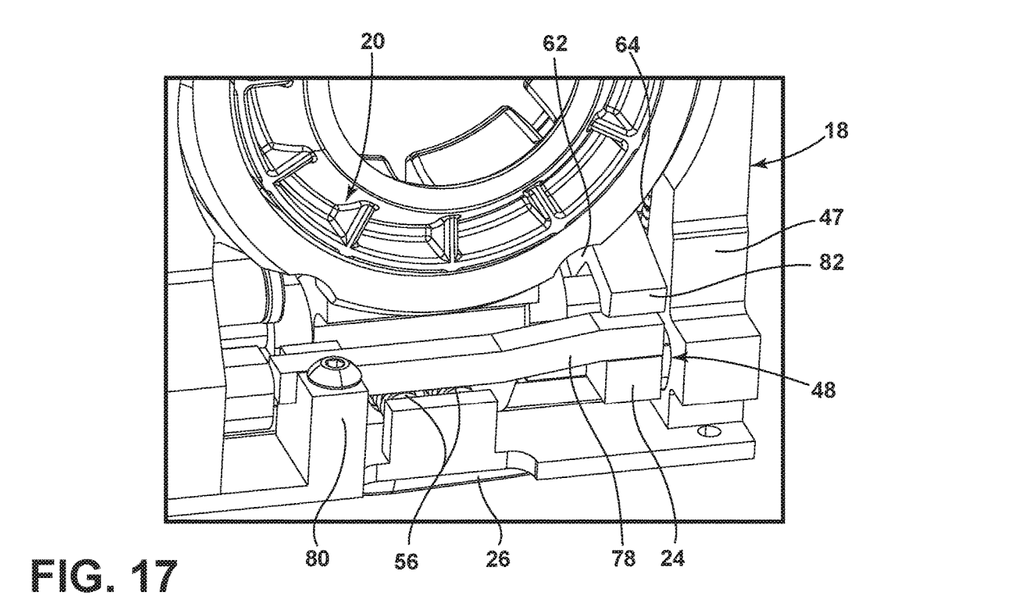
FIG. 17 a perspective detail view of the actuation mechanism in the downwardly-angled latched condition.
Figure 18:
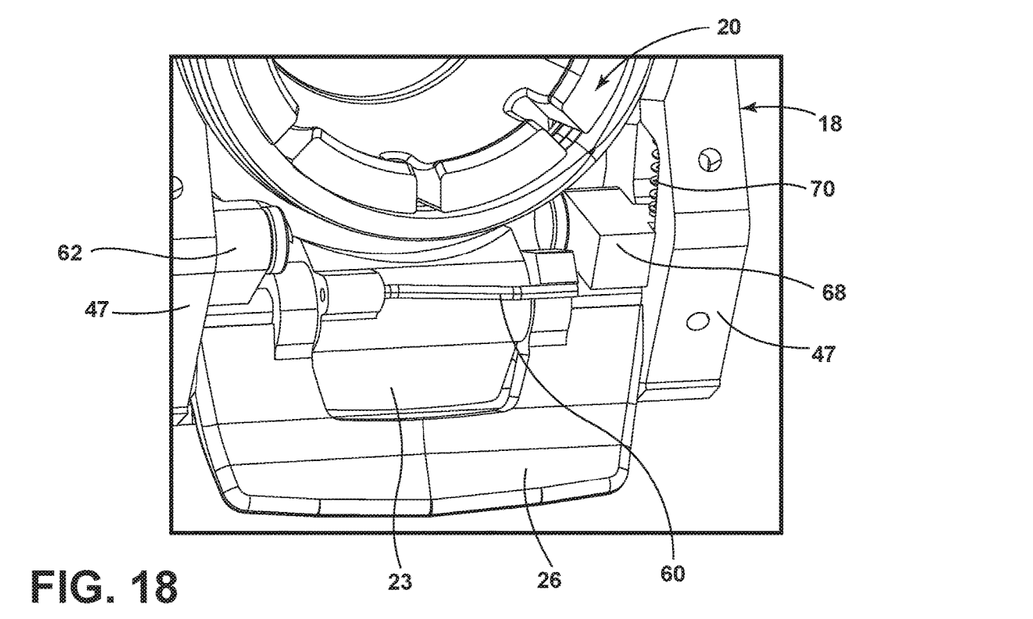
FIG. 18 is a further perspective detail view of the actuation mechanism in the downwardly-angled latched condition.

Subsequent release of toggle paddle 26, as shown in FIGS. 16-18 allows toggle latch 24 to move downward such that post 54 moves into second detent 52 under the force of lever spring 60 on toggle paddle 26 (similar movement of second toggle latch 72 also occurring). The positioning of post 54 within second detent 52 provides at least an initial degree of securement of toggle latch 24 in the depicted second position. Further, the lowering of toggle latch 24 moves it out of contact with the bent blocking element 78 such that blocking element 78 is free to move, by way of its bias toward such position, to the depicted position above toggle latch 24. The depicted shape of first locking pawl 62 is such that the free end 82 thereof is tapered, allowing blocking element 78 to move to the depicted position before the lowering of first locking pawl 62, by way of the force of first support spring 64 (toggle latch 24 no longer displacing first locking pawl 62), moves free end 82 into contact with blocking element 78, pressing blocking element 78 downwardly on toggle latch 24. This positioning helps maintain post 54 in the illustrated position within second detent 52 (the rearwardly-angled orientation of second detent 52 further helping maintain such positioning). This arrangement helps maintain support unit 18 in the depicted downwardly-angled position against the force of primary springs 56, including during repositioning of substrate 12 by movement of mounting plate 20 with respect to mounting arm 36, or when vehicle 28 incurs bumps or heavy vibration.

As shown in FIG. 18 the above-mentioned lowering of second toggle latch 72 by release of toggle paddle 26 allows second locking pawl 68 to lower under force of second support spring 70 to the depicted position in which second locking pawl 68 contacts the rear-upper surface of toggle paddle 26. As shown, when in such a position, second toggle latch 72 is angled downwardly so as to exert a force of toggle paddle 26 with a component in the forward direction. This force helps to further maintain support unit 18 in the depicted downwardly-angled position, including during lowering of first and second toggle latches 24 and 72 into their respective second positions (including the positioning of first locking pawl 62 and blocking element 78 shown in FIG. 17). This arrangement maintains support unit 18 in the depicted downwardly-angled position until subsequent rotation of toggle paddle 26 again in direction 66 (FIG. 19).

Figure 19:
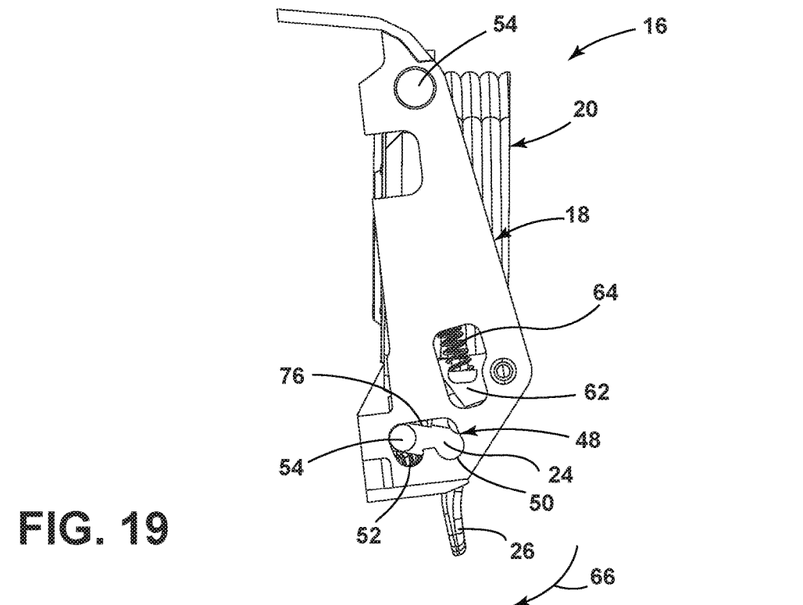
FIG. 19 is a right side view of the actuation mechanism in a downwardly-angled return released condition.
Figure 20:
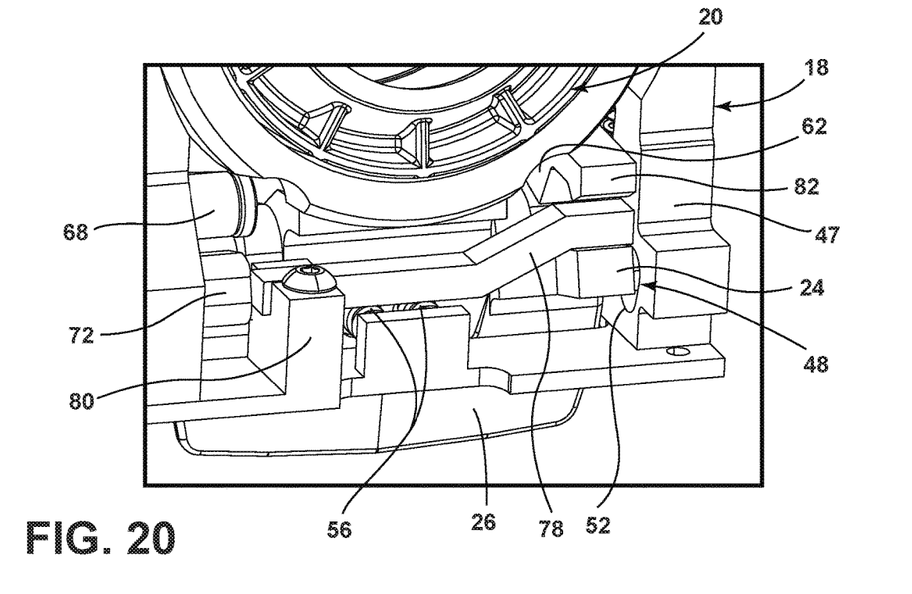
FIG. 20 is a perspective detail view of the actuation mechanism in the downwardly-angled return released condition.
Figure 21:
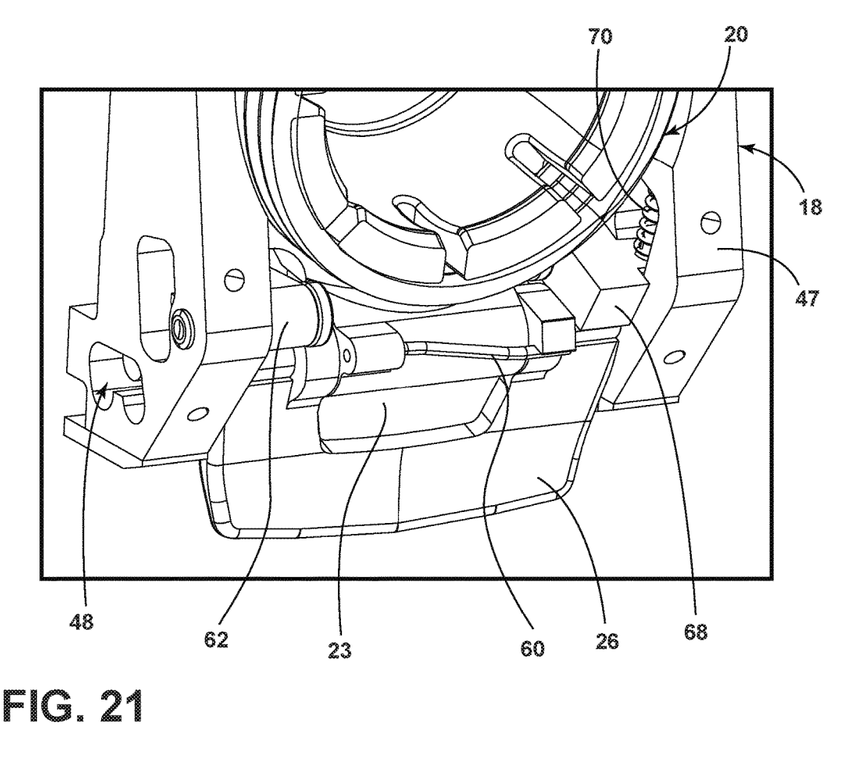
FIG. 21 is a further perspective detail view of the actuation mechanism in the downwardly-angled return released condition.

As shown in FIGS. 19-21, such subsequent movement of toggle paddle 26 in direction 66 again causes upward rotation of first toggle latch 24 (as well as second toggle latch 72), the upward movement of toggle latch 24 being against the downward biasing of blocking element 78 by first locking pawl 62 and first support spring 64. This movement results in toggle latches 24 and 72, again, moving into their respective release positions within cutouts 48 and 74, such that a "separating" force of primary springs 56 urges support unit 18 to rotate with respect to mounting plate 20 back through angle 77 (FIG. 13) (including against the forward-directed force of second locking pawl 68), including through the position depicted in FIGS. 10-12. In particular, once such movement of support unit 18 is sufficient for post 54 to clear second detent 52, toggle paddle 26 may be released, the profile of cutout 48 continuing to allow upward rotation of support unit 18 with respect to mounting plate 20. Once such rotation is complete, toggle latch 24 moves back into the first position with post 54 within first detent 50, thus returning substrate 12 to the upwardly-angled position depicted in FIGS. 5-9.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle rearview mirror, comprising:
   a substrate having a reflective surface thereon; and
   an actuation mechanism including:
      a support unit coupled with the substrate opposite the reflective surface;
      a mounting plate having a first end rotatably coupled with the support unit and a second end spaced from the first end;
      a toggle latch rotatably coupled with the mounting plate and alternately engaging with the support unit in respective first and second positions, the second position corresponding with rotation of the support unit toward the second end of the mounting plate from the first position, the toggle latch further being rotatable out of the first and second positions into a release position wherein the toggle latch is disengaged with the support unit; and
      a toggle paddle rotatably coupled with the mounting plate and positioned adjacent the toggle latch to move the toggle latch into the release position by rotation of the toggle paddle.

2. The rearview mirror of claim 1, further including a spring operably engaged between the mounting plate and the support unit and applying a separating force therebetween to urge the support unit into the second position.

3. The rearview mirror of claim 1, further including a locking pawl engaging between the support unit and the mounting plate when the toggle latch is in the first position.

4. The rearview mirror of claim 1, further including a locking pawl engaging between the support unit and the mounting plate when the toggle latch is in the second position.

5. The rearview mirror of claim 4, further including a blocking element biased into engagement between a free end of the locking pawl and the toggle latch when the toggle latch is in the second position.

6. The rearview mirror of claim 5, wherein the blocking element is an elastically-deformable bar fixedly coupled with the support unit at a fixed end and extending laterally to a free end adjacent the locking pawl.

7. The rearview mirror of claim 1, further including:
   a first locking pawl engaging between the support unit and the mounting plate when the toggle latch is in the first position; and
   a second locking pawl engaging between the support unit and the mounting plate when the toggle latch is in the second position.

8. The rearview mirror of claim 7, wherein:
   the toggle latch is a first toggle latch coupled with the mounting plate adjacent the first locking pawl, a second toggle latch being rotatably coupled with mounting plate adjacent the second locking pawl; and
   rotation of the toggle paddle further moves the first and second toggle latches into engagement with the first and second locking pawls, respectively, and disengages the first and second locking pawls from the support unit.

9. The rearview mirror of claim 8, wherein:
   the toggle paddle is rotatably coupled with the mounting plate along first and second upper hinge portions with which the first and second locking pawls respectively engage; and the upper hinge portions are positioned with respect to the first and second toggle latches to allow movement of the first and second toggle latches into engagement with the first and second locking pawls.

10. The rearview mirror of claim 1, wherein the toggle latch is integrally coupled with toggle paddle.

11. The rearview mirror of claim 1, wherein the toggle paddle is biased into a position corresponding with first and second positions of toggle latch.

12. The rearview mirror of claim 1, wherein:
the substrate includes a display panel having an active state and an inactive state;
the first position of the support unit corresponds with the inactive state of the display panel; and
the second position of the support unit corresponds with the active state of the display panel.

13. A vehicle, comprising:
a windshield;
a headliner adjacent an upper edge of the windshield; and
a mirror assembly, comprising:
a substrate having a reflective surface thereon;
a support unit coupled with the substrate opposite the reflective surface;
a mounting plate having a first end rotatably coupled with the support unit and a second end spaced from the first end;
a mounting structure coupled with the mounting plate and coupling with the vehicle adjacent the upper edge of the windshield;
a toggle latch rotatably coupled with the mounting plate and alternately engaging with the support unit in respective first and second positions, the second position corresponding with rotation of the support unit toward the second end of the mounting plate from the first position, the toggle latch further being rotatable out of the first and second positions into a release position wherein the toggle latch is disengaged with the support unit; and
a toggle paddle rotatably coupled with the mounting plate and positioned adjacent the toggle latch to move the toggle latch into the release position by rotation of the toggle paddle.

14. The vehicle of claim 13, wherein the mirror assembly further includes:
a first locking pawl engaging between the support unit and the mounting plate when the toggle latch is in the first position; and
a second locking pawl engaging between the support unit and the mounting plate when the toggle latch is in the second position.

15. The vehicle of claim 14, wherein:
the toggle latch is a first toggle latch coupled with the mounting plate adjacent the first locking pawl, a second toggle latch being rotatably coupled with mounting plate adjacent the second locking pawl; and
rotation of the toggle paddle further moves the first and second toggle latches into engagement with the first and second locking pawls, respectively, and disengages the first and second locking pawls from the support unit.

16. The vehicle of claim 15, wherein:
the toggle paddle is rotatably coupled with the mounting plate along first and second upper hinge portions with which the first and second locking pawls respectively engage; and
the upper hinge portions are positioned with respect to the first and second toggle latches to allow movement of the first and second toggle latches into engagement with the first and second locking pawls.

17. The vehicle of claim 14, further including a blocking element biased into engagement between a free end of the locking pawl and the toggle latch when the toggle latch is in the second position;
wherein the blocking element is an elastically-deformable bar fixedly coupled with the support unit at a first end and extending laterally to a second free end adjacent the locking pawl.

18. The vehicle of claim 13, wherein the toggle paddle is biased into a position corresponding with first and second positions of toggle latch.

19. The vehicle of claim 13, wherein:
the substrate includes a display panel having an active state and an inactive state;
the first position of the support unit corresponds with the inactive state of the display panel; and
the second position of the support unit corresponds with the active state of the display panel in which the substrate is angled upwardly toward the headliner of the vehicle by an angle of between 5 degrees and 10 degrees with respect to the first position.

20. An actuation mechanism for a vehicle mirror comprising:
a support unit;
a mounting plate having a first end rotatably coupled with the support unit;
a toggle latch rotatably coupled with the mounting plate, alternately engaging with the support unit in respective first and second positions, and being rotatable out of the first and second positions into a release position wherein the toggle latch is disengaged with the support unit; and
a toggle paddle rotatably coupled with the mounting plate and positioned adjacent the toggle latch to move the toggle latch into the release position by rotation of the toggle paddle.

* * * * *